(12) United States Patent
Seki

(10) Patent No.: US 7,204,352 B2
(45) Date of Patent: Apr. 17, 2007

(54) BRAKE DEVICE FOR VEHICLE

(75) Inventor: Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/273,122

(22) Filed: Oct. 18, 2002

(65) Prior Publication Data

US 2003/0136612 A1 Jul. 24, 2003

(30) Foreign Application Priority Data

Oct. 23, 2001 (JP) ............................. 2001-325632

(51) Int. Cl.
*F16D 65/09* (2006.01)
*B60K 17/356* (2006.01)

(52) U.S. Cl. ................. 188/73.34; 188/73.42; 188/73.45; 188/73.39; 188/369; 180/244; 180/370

(58) Field of Classification Search ............. 188/18 A, 188/73.31, 73.32, 73.33, 73.34, 152, 361, 188/368, 369, 151 R, 233, 244, 71.1, 72.1, 188/72.4, 73.1, 73.39, 73.41, 73.42, 73.43, 188/73.44, 73.45; 192/218, 221, 221.1; 180/244, 180/370, 908

See application file for complete search history.

(56) References Cited

U.S. PATENT DOCUMENTS

| | | | | | |
|---|---|---|---|---|---|
| 4,191,278 | A | * | 3/1980 | Karasudani | 188/73.39 |
| 4,392,560 | A | * | 7/1983 | Nakasu et al. | 188/73.34 |
| 4,667,760 | A | * | 5/1987 | Takimoto | 188/73.32 |
| 4,719,984 | A | * | 1/1988 | Watanabe | 188/18 A |
| 6,454,056 | B1 | * | 9/2002 | Iida | 188/73.45 |
| 6,491,126 | B1 | * | 12/2002 | Robison et al. | 180/233 |
| 6,883,630 | B2 | * | 4/2005 | Morin | 180/244 |

FOREIGN PATENT DOCUMENTS

JP    58109739 A  *  6/1983

* cited by examiner

*Primary Examiner*—Thomas Williams
(74) *Attorney, Agent, or Firm*—Birch, Stewart, Kolasch & Birch, LLP

(57) ABSTRACT

A brake device includes a brake disk fixed to a power transmission shaft, and a brake caliper for braking the brake disk by a nipping action. The brake caliper includes a caliper bracket fitted to a final gear case, and a caliper body detachably fitted to the caliper bracket, wherein the caliper body is fitted to the caliper bracket by a pair of fixing bolts. The screw-fitting directions of the individual bolts of the pair of fixing bolts are opposite to each other. The aforementioned brake device for a vehicle permits maintenance work to be quickly and easily carried out.

21 Claims, 8 Drawing Sheets

BRAKE DEVICE FOR VEHICLE

BACKGROUND OF THE INVENTION

CROSS-REFERENCES TO RELATED APPLICATIONS

This nonprovisional application claims priority under 35 U.S.C. § 119(a) on Patent Application No. 2001-325632 filed in Japan on Oct. 23, 2001, the entirety of which is herein incorporated by reference.

1. Filed of the Invention

The present invention relates to a brake device for a vehicle, and particularly to a brake device for a vehicle suitable for running on rough or uneven terrain.

2. Description of the Background Art

A vehicle for running on rough or uneven terrain, e.g. an All Terrain Vehicle (ATV) as shown in FIGS. 4 to 7, has been available in the background art. The vehicle 1 includes a vehicle body frame 3, an engine 2 mounted at a roughly central portion of the vehicle body frame 3, a pair of left and right front wheels 4 vertically suspended from and capable of being oscillated with respect to front lower portions of the vehicle body frame 3, a pair of left and right rear wheels 5 vertically suspended from and capable of being oscillated with respect to rear lower portions of the vehicle body frame 3. The vehicle 1 also includes a steering device 6 provided at a front portion of the vehicle body frame 3 for steering the front wheels, a fuel tank 7 provided on the rear side of the steering device 6, a seat 8 provided on the rear side of the fuel tank 7, a front fender 9 provided to cover the upper and rear sides of the front wheels 4, and a rear fender 10 provided to cover the upper and front sides of the rear wheels.

As shown in FIGS. 6 and 7, a pair of propeller shafts 11–12 for transmitting the output of the engine 2 to the front wheels 4 and the rear wheels 5 are provided respectively on the front and rear sides of the engine 2. Final gear cases 13–14 for transmitting the output of the engine 2 to the front wheels 4 and the rear wheels 5 are provided respectively at tip end portions of the propeller shafts 11–12. The final gear cases 13–14 are fixed to the vehicle body frame 3, and a brake device 15 is provided between the final gear case 14 on the rear wheel side and the propeller shaft 12 on the rear wheel side.

The brake device 15 includes a brake disk 16 fitted to the propeller shaft 12, and a brake caliper 17 fitted to the final gear case 14. The brake device is operated by a braking operation of the rider M to brake the propeller shaft 12, thereby braking the rear wheels 5. FIG. 8 is a side view of a brake caliper of the background art. As shown in FIG. 8, the brake caliper 17 is of the so-called collet type brake caliper that includes a caliper bracket 18 fixed to the final gear case 14, and a caliper body 19 fitted to the caliper bracket 18. The caliper body 19 can be fitted to and detached from the caliper bracket 18 by a pair of fixing bolts 20 provided to penetrate through the caliper body 19.

In the vehicle of the background art described hereinabove, the present inventors have determined that the following problems may be solved. The brake device 15 periodically requires maintenance such as replacement of brake pad(s) and other component members thereof. In the case of performing the above-mentioned maintenance, it is necessary to remove both the fixing bolts 20 and detach the caliper body 19 from the caliper bracket 18. Alternatively, a mechanic must remove only one of the fixing bolts 20 and turn the caliper body 19 around the other of the fixing bolts 20, thereby opening the portion covering the brake disk 16 and exposing the brake pad located in the caliper body 19.

However, in the brake device described hereinabove, the pair of fixing bolts 20 for fixing the caliper body 19 to the caliper bracket 18 are screw-fitted in the same direction with respect to the vehicle body. Therefore, the direction of operations for fitting and detaching the fixing bolts 20 is limited to one direction. In addition, the fitting and detaching of the fixing bolts 20 is restricted.

SUMMARY OF THE INVENTION

The present invention overcomes the shortcomings associated with the background art and achieves other advantages not realized by the background art.

An object of the present invention is to provide a brake device for a vehicle for which maintenance work can be quickly and easily carried out.

One or more of these and other objects are accomplished by a brake device for a vehicle, the vehicle including a vehicle body frame, an engine mounted on the vehicle body frame, front wheels and rear wheels suspended from and capable of being oscillated with respect to the vehicle body frame, final gear cases for transmitting an output from the engine to the front wheels and the rear wheels, and power transmission shafts for transmitting a driving force from the engine to the rear wheels and the front wheels through the final gear cases, the brake device comprising a brake disk fixed to at least one of the power transmission shafts; and a brake caliper for braking by a nipping action with the brake disk, wherein the brake caliper includes a caliper bracket fitted to at least one of the final gear cases, a caliper body detachably fitted to the caliper bracket, and a pair of fixing bolts securing the caliper body to the caliper bracket, wherein the pair of fixing bolts includes a first bolt and a second bolt, a screw-fitting direction of the first fixing bolt being opposite to a screw-fitting direction of the second fixing bolt.

One or more of these and other objects are further accomplished by a brake device for a vehicle, the vehicle including a vehicle body frame, an engine mounted on the vehicle body frame, front wheels and rear wheels suspended from and capable of being oscillated with respect to the vehicle body frame, final gear cases for transmitting an output from the engine to the front wheels and the rear wheels through drive shafts, power transmission shafts for transmitting a driving force from the engine to the rear wheels and the front wheels through the final gear cases, the brake device comprising a brake disk fixed to at least one of the drive shafts; and a brake caliper for braking by a nipping action with the brake disk, wherein the brake caliper includes a caliper bracket fitted to at least one of the final gear cases, a caliper body detachably fitted to the caliper bracket, and a pair of fixing bolts securing the caliper body to the caliper bracket, wherein pair of fixing bolts includes a first bolt and a second bolt, a screw-fitting direction of the first fixing bolt being opposite to a screw-fitting direction of the second fixing bolt.

One or more of these and other objects are further accomplished by a method of maintaining the vehicle brake device(s) described hereinabove, comprising removing at least one of the first and the second fixing bolts from a side with respect to the vehicle body frame; turning the caliper body around at least one of the slide pin and the collar to which the at least one of the first and the second fixing bolts is screw-fitted; and opening a portion overlapping with the brake disk to expose the brake pad for a maintenance activity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
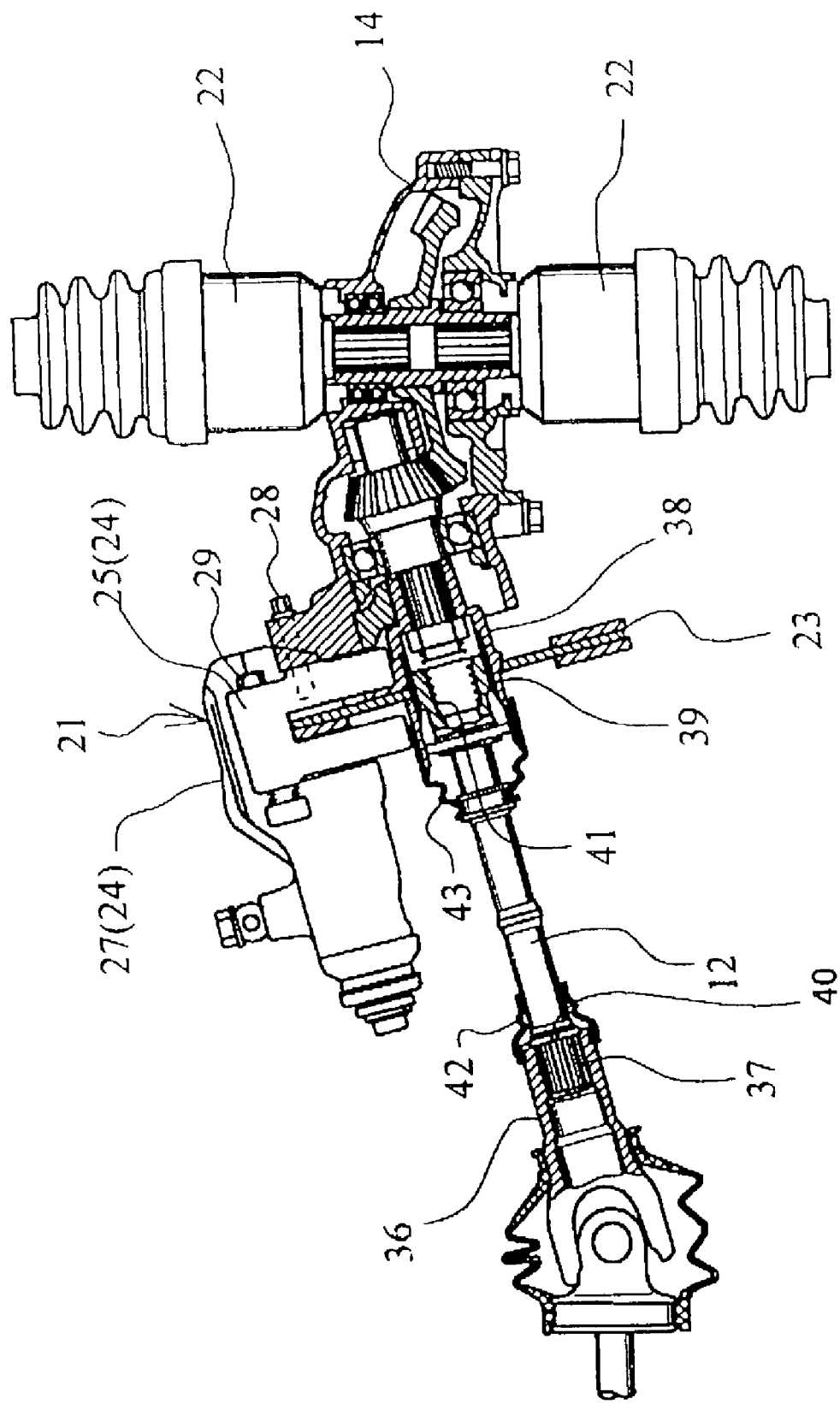
FIG. 1 is a partial, side view of a portion of an embodiment of the present invention.
Figure 2:
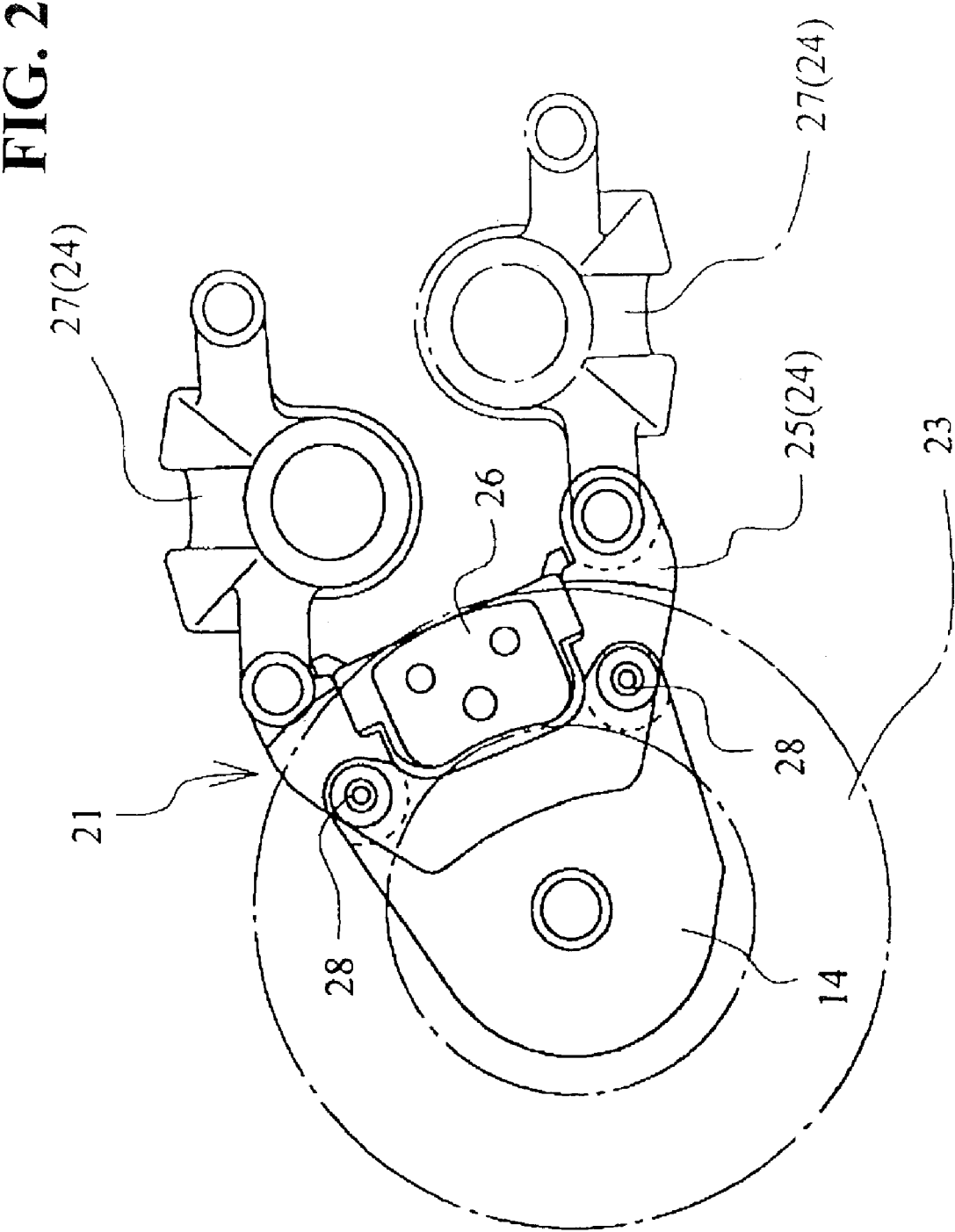
FIG. 2 is an enlarged, frontal view of a portion of an embodiment of the present invention as viewed from the front side of the vehicle.
Figure 3:
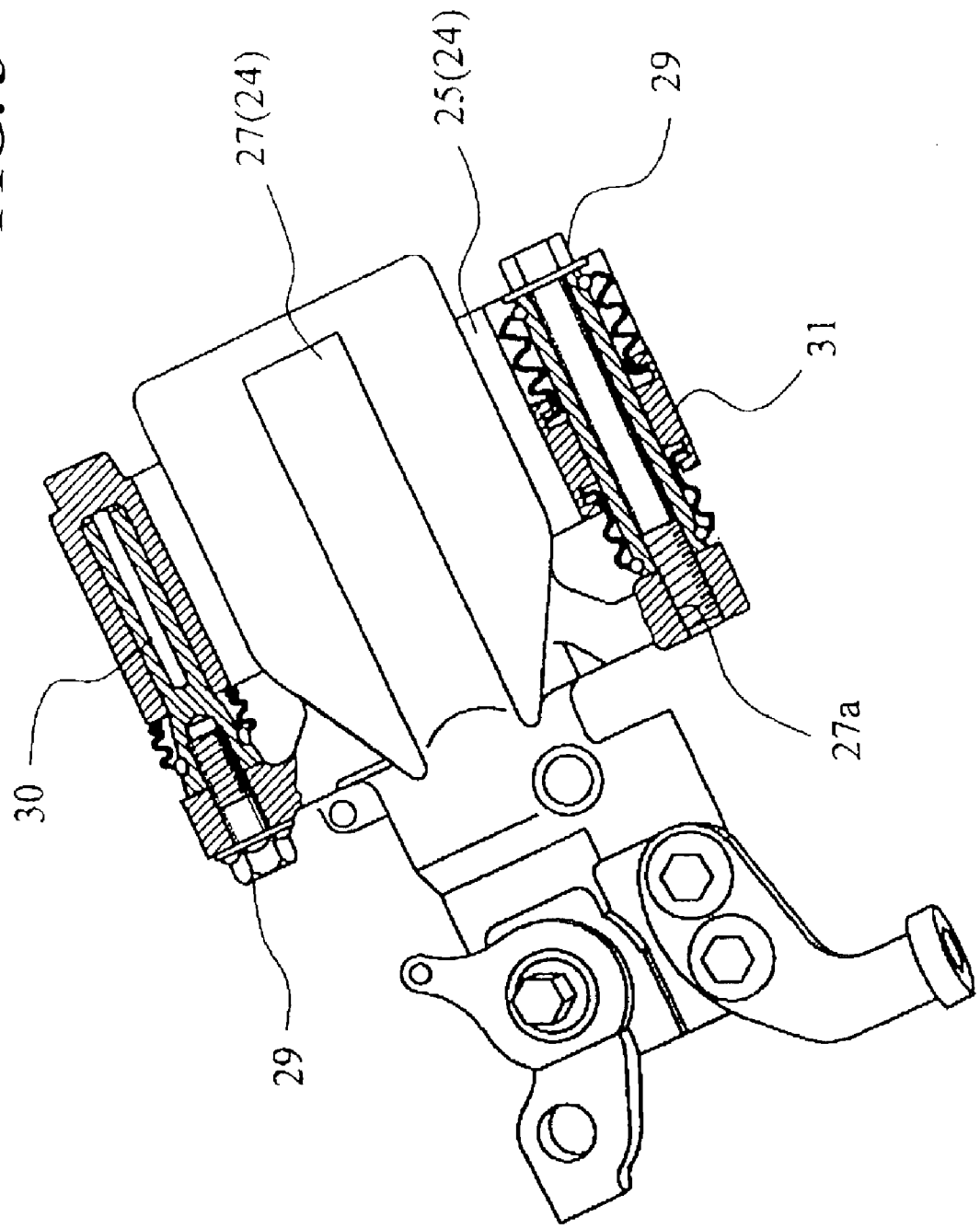
FIG. 3 is a partial sectional view of a portion of an embodiment of the present invention as viewed from the rear side of the vehicle.
Figure 4:
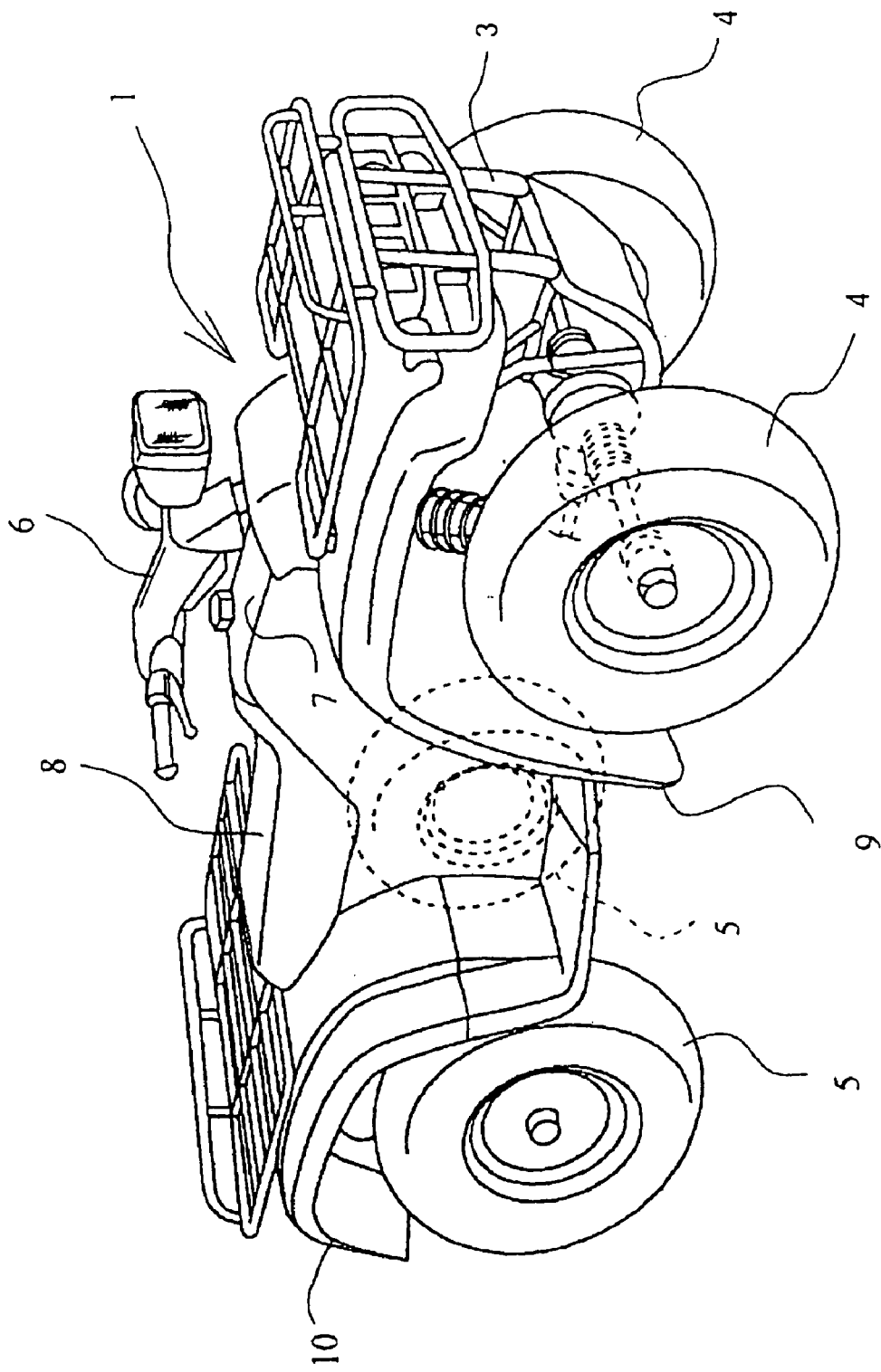
FIG. 4 is a perspective view of a vehicle for running on rough or uneven terrain.
Figure 5:
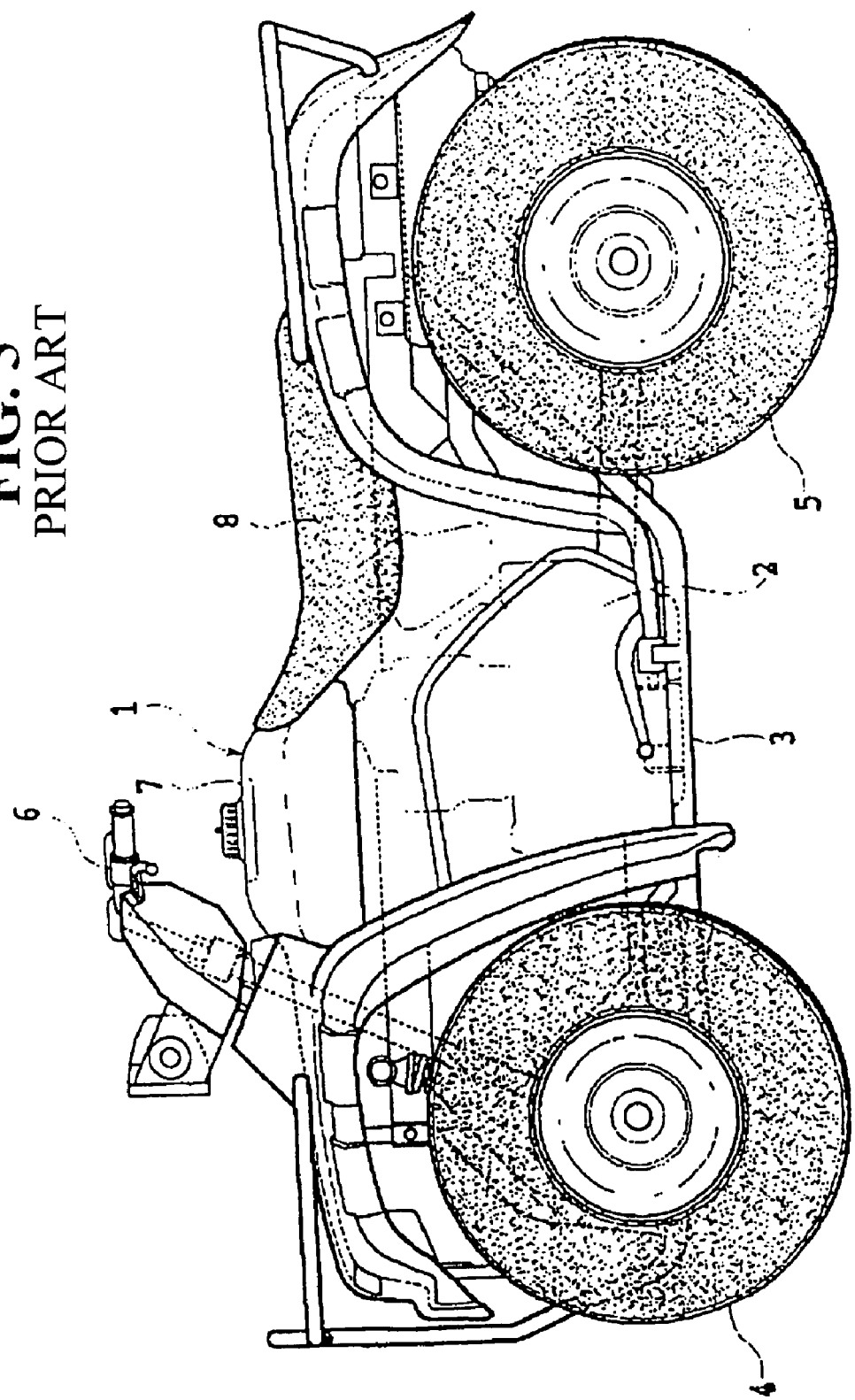
FIG. 5 is a side view of the vehicle for running on rough or uneven terrain.
Figure 6:
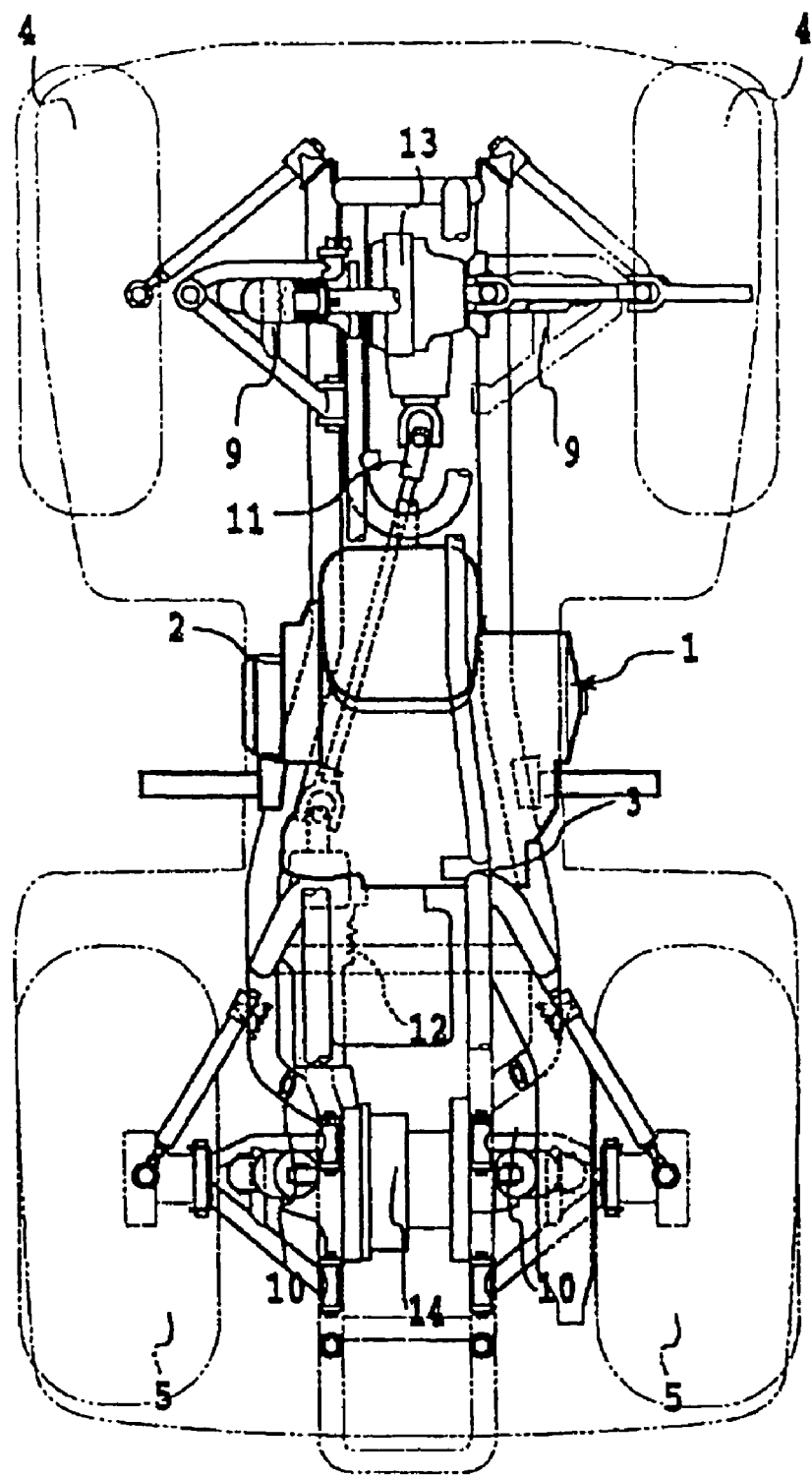
FIG. 6 is a plan view of a frame of the vehicle for running on rough or uneven terrain shown in FIG. 5.
Figure 7:
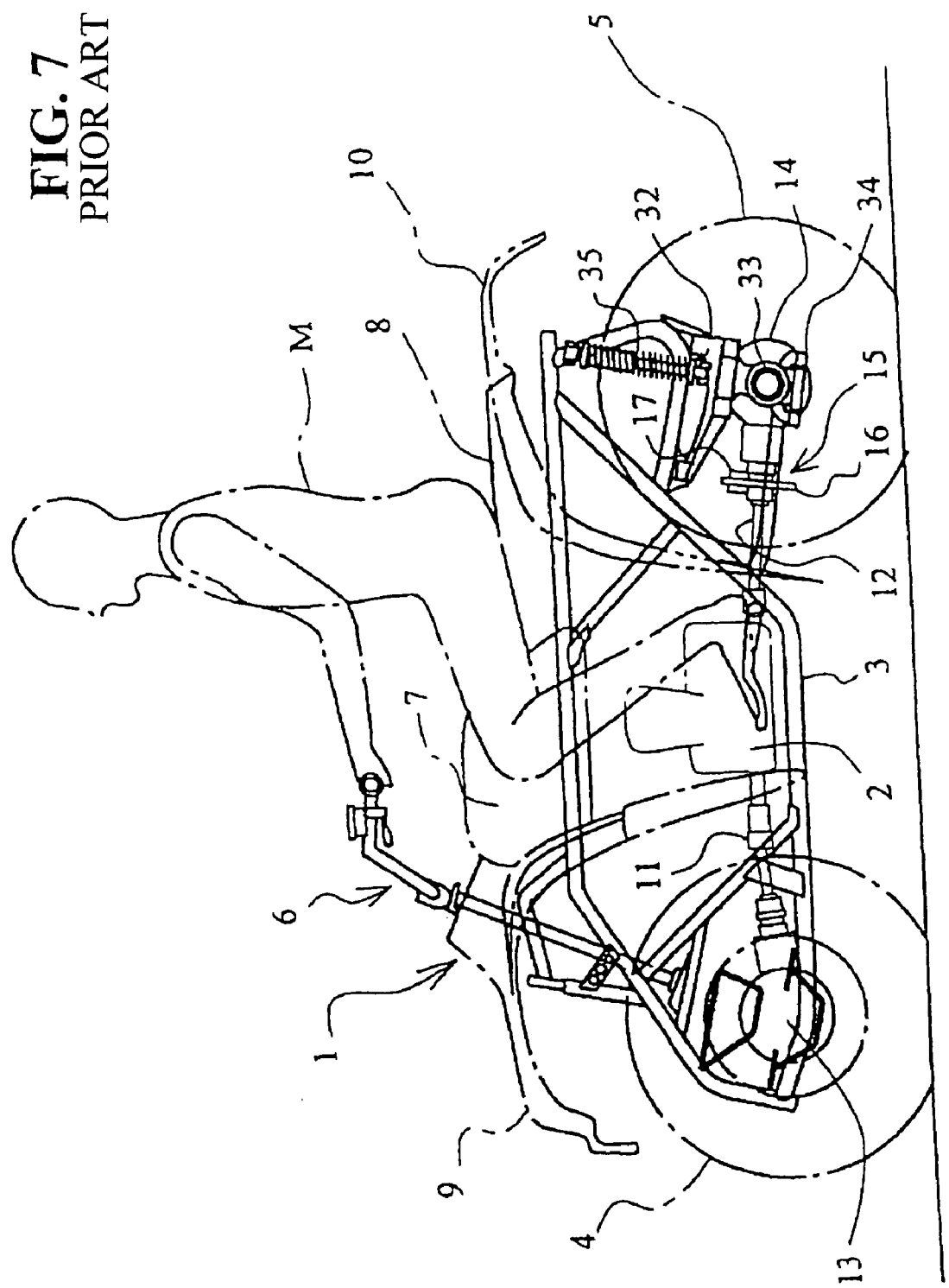
FIG. 7 is a side view of the frame of the vehicle for running on rough or uneven terrain shown in FIG. 5.
Figure 8:
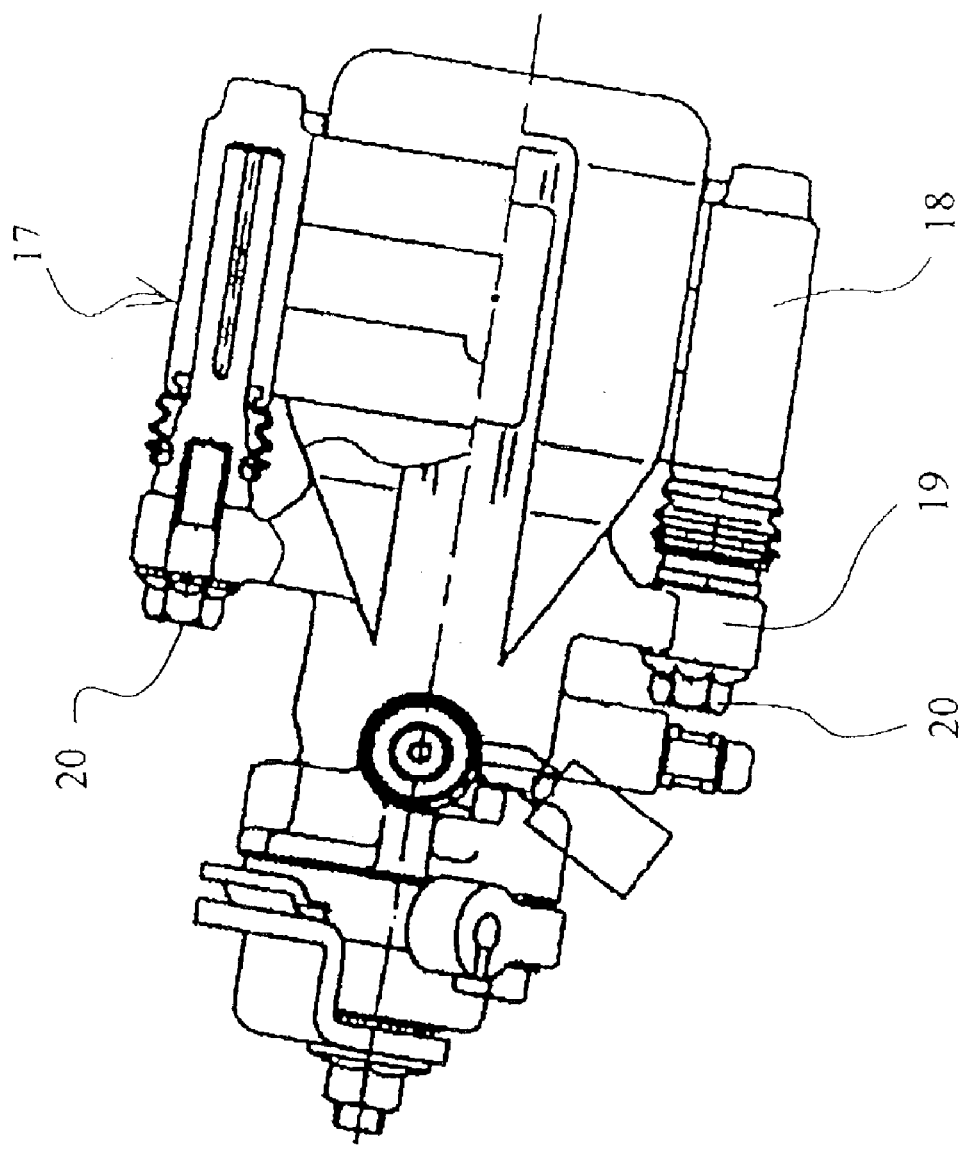
FIG. 8 is a side view of a brake caliper of the background art.

The present invention will hereinafter be described with reference to the accompanying drawings. FIG. 1 is a partial, side view of a portion of an embodiment of the present invention. FIG. 2 is an enlarged, frontal view of a portion of an embodiment of the present invention as viewed from the front side of the vehicle. FIG. 3 is a partial sectional view of a portion of an embodiment of the present invention as viewed from the rear side of the vehicle. FIG. 4 is a perspective view of a vehicle for running on rough or uneven terrain. FIG. 5 is a side view of the vehicle for running on rough or uneven terrain. FIG. 6 is a plan view of a frame of the vehicle for running on rough or uneven terrain shown in FIG. 5. FIG. 7 is a side view of the frame of the vehicle for running on rough or uneven terrain shown in FIG. 5. An embodiment of the present invention will be described hereinafter with reference to FIGS. 1 to 3.

The present embodiment shows an example of an application of the present invention to a vehicle for running on rough or uneven terrain, e.g., as shown in FIGS. 4 to 7. Major component members thereof are the same as in FIGS. 4 to 7, so that the major component members will be denoted by the same symbols, and description thereof will be simplified. As shown in FIG. 1, the brake device 21 for a vehicle according to the present embodiment is used for a vehicle including a propeller shaft 12 for rear wheels 5 connected to the engine 2, and a final gear case 14 for transmitting the rotation of the propeller shaft 12 to both the rear wheels 5 through a pair of left and right drive shafts 22. The brake device 21 includes a brake disk 23 fixed to the propeller shaft 12, and a brake caliper 24 for braking by a nipping action with the brake disk 23. The brake caliper 24 is generally fitted to the final gear case 14.

The details of these components will be described in greater detail hereinafter. As shown in FIG. 1, the brake disk 23 is fitted to a tip end portion of the propeller shaft 12 in the vicinity of the final gear case 14. The brake caliper 24 is of the collet type, e.g. including a caliper bracket 25 fitted to the final gear case 14, a caliper body 27 which is detachably fitted to the caliper bracket 25, and a piston for pressing a brake pad 26 (described later) against the brake disk 23 is incorporated within the caliper bracket 25.

As shown in FIG. 2, the caliper bracket 25 is fixed to the final gear case 14 on the front side with respect to the vehicle 1 by a pair of bolts 28, and the caliper body 27 is fitted to the caliper bracket 25 by a pair of fixing bolts 29, as shown in FIG. 3. At a portion of the caliper bracket 25 to which one side of the caliper body 27 is fixed, a slide pin 30 parallel to the propeller shaft 12 is fitted from the front side with respect to the vehicle 1, and one of the fixing bolts 29 provided penetrating through the caliper body 27 is screw-fitted to the slide pin 30.

At a portion of the caliper bracket 25 to which the other side of the caliper body 27 is fixed, a collar 31 parallel to the propeller shaft 12 is fitted. In addition, the caliper body 27 is provided with a female screw 27a at a position opposed to the collar 31, and the other of the fixing bolts 29 is inserted into the collar 31 from the rear side with respect to the vehicle 1 and is screw-fitted to the female screw 27a formed in the caliper body 27.

Therefore, the caliper body 27 is fixed to the caliper bracket 25 by a pair of the fixing bolts 29 screw-fitted from the front and rear directions, e.g., with respect to the vehicle 1 or vehicle body frame 3. For example, the other of the fixing bolts 29 can be removed from the rear side with respect to the vehicle 1. In the condition where the other fixing bolt 29 is removed, the caliper body 27 is turned around the slide pin 30 to which one of the fixing bolts 29 is screw-fitted as indicated by the solid line in FIG. 2. The portion overlapping with the brake disk 23 is opened and the brake pad 26 is exposed.

Alternatively, the fixing bolt 29 from the front side with respect to the vehicle 1 can be removed. In the condition where the fixing bolts 29 from the front side is removed, the caliper body 27 is turned with the collar 31 serving as a center, as indicated by chain line in FIG. 2, whereby the portion overlapping with the brake disk 23 is opened the brake pad 26 is exposed. In FIG. 7, an upper arm 32 rotatably connected to an upper portion of the vehicle body frame 3 and to an upper portion of an axle housing 33 fitted with the rear wheel 5, a lower arm 34 rotatably connected to a lower portion of the vehicle body frame 3 and to a lower portion of the axle housing 33, and a shock absorber 35 provided between the upper arm 32 and the vehicle body frame 3 are also provided for the vehicle 1.

The upper arm 32, the lower arm 34, and the shock absorber 35 make up a suspension device for the rear wheel 5. Further, as shown in FIG. 1, a front end portion of the propeller shaft 12 is connected through a spline 37 to a universal joint 36 fitted to the engine 2, and a rear end portion of the propeller shaft 12 is connected to an input shaft 38 of the final gear case 14 through a spline 39. In the present embodiment, the brake disk 23 is fitted to the input shaft 38. In addition, a front end portion of the propeller shaft 12 on the rear side of the portion where the spline 37 is formed has an outside diameter smaller than the outside diameter of the spline 37, whereby the front end portion of the propeller shaft 12 can penetrate into the universal joint 36.

An engaging and stopping ring 40 made up of a C ring fitted to the front end portion of the propeller shaft 12 is brought into contact with an end face of the universal joint 36, whereby further penetration is hampered and spline-fitting to the universal joint 36 is maintained. Further, a compression spring 41 is intermediately provided between a rear end portion of the propeller shaft 12 and the input shaft 38. The propeller shaft 12 is pushed toward the universal joint 36 by the compression spring 41, and the engaging and stopping ring 40 and the universal joint 36 are brought into contact with each other. The spline-fitting between the propeller shaft 12 and the universal joint 36 and between the propeller shaft 12 and the input shaft 38 is maintained by the aforementioned arrangement.

The fitting portions of the propeller shaft 12 and the universal joint 36 and the input shaft 38 are covered with boots 42–43, respectively. When the boot 42 is removed and thereafter the engaging and stopping ring 40 is removed, the front end portion of the propeller shaft 12 is inserted into the universal joint 36. Here, the distance over which the propeller shaft 12 can be inserted into the universal joint is set to be longer than the spline-fitting length between the propeller shaft 12 and the input shaft 38. With this setting, by pulling the rear end portion of the propeller shaft 12 out of the input shaft 38, thereafter turning the rear end portion around the inside of the universal joint 36 and moving it rearwards, the front end portion of the propeller shaft 12 can be pulled out of the universal joint 36 and the propeller shaft 12 can thereby be removed. The propeller shaft 12 is fitted into place with a reverse operation.

In the brake device 21 according to the present embodiment described hereinabove, the portion of the caliper body 27 overlapping with the brake disk 23 can be opened. Accordingly, the brake pad 26 located at the overlapping portion can be exposed by rotating and removing either one of the pair of the fixing bolts 29 from the front side or the rear side with respect to the vehicle 1 and turning the caliper body 27 around the remaining bolt 29 of the fixing bolts 29. This arrangement provides the flexibility of a plurality of fitting situations for component members, e.g., such as accessories in the surroundings of the brake device 21.

As a result, operations from the portion not covered with the accessories or the like can be carried out, and maintenance work for the brake device 21 can be carried out quickly and easily. Particularly, in the vehicle 1 for running on rough or uneven terrain to which the present embodiment is applied, the accessories and the like are scarcely present on the rear side of the final gear case 14. Accordingly, by conducting the maintenance work from the rear side with respect to the vehicle 1, the work can be carried out more easily.

The shapes, dimensions and the like of the component members shown in the present embodiment are mere examples, and they can be variously modified according to design requirements and the like. For example, while an example in which the brake device 21 is provided on the side of the rear wheels 5 has been shown in the present embodiment, the brake device 21 can also be applied to the front side of the front wheels 4. In addition, while an example in which the brake device 21 is provided between the propeller shaft 12 and the final gear case 14 has been shown, the brake device 21 may also be provided between the final gear case 14 (13) and the drive shaft 22.

As has been described above, in opening the overlapping portion between the caliper body and the brake disk, operations from the two opposite directions with respect to the brake caliper can be performed. This permits maintenance work for the brake device to be carried out from the opened directions around the brake device, and the work can be more easily facilitated. In addition, the installation position of the brake device does not have to be limited by the fitting situations of accessories, and the scope of the kinds of the vehicles to which the brake device is applicable can be enlarged, e.g. vehicles besides those particularly designed to operate on rough or uneven terrain.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels, and power transmission shafts for transmitting a driving force from said engine to said rear wheels and said front wheels through said final gear cases, said brake device comprising:
   a brake disk fixed to at least one of said power transmission shafts, wherein said power transmission shafts are propeller shafts for connecting said engine and said final gear cases to each other;
   a brake caliper for braking by a nipping action with said brake disk, wherein said brake caliper includes:
   a caliper bracket fitted to at least one of said final gear cases by a pair of mounting bolts,
   a caliper body detachably fitted to said caliper bracket,
   a pair of fixing bolts securing said caliper body to said caliper bracket, wherein said pair of fixing bolts includes a first bolt and a second bolt extending substantially in parallel with said power transmission shafts, a screw-fitting direction of said first fixing bolt being opposite to a screw-fitting direction of said second fixing bolt, and wherein said screw-fitting direction of said first bolt is offset with respect to said screw-fitting direction of said second bolt, and said brake caliper is capable of turning around one of said first and second bolts when either said first or second bolt is in a disengaged position; and
   a collar extending substantially parallel to at least one of said propeller shafts and fitted at a portion of the caliper bracket wherein the second fixing bolt is inserted through the caliper bracket and the collar from a rear side with respect to the vehicle body frame and is screw-fitted into female threads formed in said caliper body.

2. The brake device according to claim 1, wherein a screw-fitting position of the first fixing bolt and a screw-fitting position of the second fixing bolt are in a front and rear direction of the vehicle body frame, respectively.

3. The brake device for a vehicle according to claim 1, wherein said fixing bolts are disposed along a front-rear direction of said vehicle body frame.

4. The brake device according to claim 1, wherein a screw-fitting position of the first fixing bolt and a screw-fitting position of the second fixing bolt are arranged on a same side of the caliper bracket.

5. The brake device for a vehicle according to claim 1, wherein said brake disk is fixed to an input shaft of at least one of said final gear cases.

6. A brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels, and power transmission shafts for transmitting a driving force from said engine to said rear wheels and said front wheels through said final gear cases, said brake device comprising:
  a brake disk fixed to at least one of said power transmission shafts, wherein said power transmission shafts are propeller shafts for connecting said engine and said final gear cases to each other; and
  a brake caliper for braking by a nipping action with said brake disk, wherein said brake caliper includes
  a caliper bracket fitted to at least one of said final gear cases,
  a caliper body detachably fitted to said caliper bracket,
  a pair of fixing bolts securing said caliper body to said caliper bracket, wherein said pair of fixing bolts includes a first bolt and a second bolt extending substantially in parallel with said propeller shafts, a screw-fitting direction of said first fixing bolt being opposite to a screw-fitting direction of said second fixing bolt, and wherein said screw-fitting direction of said first bolt is offset with respect to said screw-fitting direction of said second bolt and wherein said fixing bolts are disposed along a front-rear direction of said vehicle body frame;
  a slide pin parallel to at least one of said propeller shafts and fitted at a portion of the caliper bracket from a front side with respect to the vehicle body frame, wherein the first fixing bolt penetrates through the caliper body and is screw-fitted to the slide pin; and
  a collar extending substantially parallel to at least one of said propeller shafts and fitted at a portion of the caliper bracket wherein the second fixing bolt is inserted through the caliper bracket and the collar from a rear side with respect to the vehicle body frame and is screw-fitted into female threads formed in said caliper body.

7. The brake device for a vehicle according to claim 6, wherein said brake disk is fixed to an input shaft of at least one of said final gear cases.

8. The brake device according to claim 6, wherein a screw-fitting position of the first fixing bolt and a screw-fitting position of the second fixing bolt are in a front and rear direction of the vehicle body frame, respectively.

9. The brake device according to claim 6, wherein a screw-fitting position of the first fixing bolt and a screw-fitting position of the second fixing bolt are arranged on a same side of the caliper bracket.

10. A method of maintaining a vehicle brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels, and power transmission shafts for transmitting a driving force from said engine to said rear wheels and said front wheels through said final gear cases, and said brake device including a brake disk fixed to at least one of said power transmission shafts, wherein said power transmission shafts are propeller shafts for connecting said engine and said final gear cases to each other; a brake caliper for braking by a nipping action with said brake disk, wherein said brake caliper includes a caliper bracket fitted to at least one of said final gear cases, a caliper body detachably fitted to said caliper bracket, and a pair of fixing bolts securing said caliper body to said caliper bracket, wherein said pair of fixing bolts includes a first bolt and a second bolt, and wherein said fixing bolts are disposed along a front-rear direction of said vehicle body frame and a screw-fitting direction of said first fixing bolt is opposite to a screw-fitting direction of said second fixing bolt, and said screw-fitting direction of said first bolt is offset with respect to said screw-fitting direction of said second bolt; and a slide pin parallel to at least one of said propeller shafts and fitted at a portion of the caliper bracket from a front side with respect to the vehicle body frame, wherein the first fixing bolt penetrates through the caliper body and is screw-fitted to the slide pin; and a collar parallel to at least one of said propeller shafts and fitted at a portion of the caliper bracket, said method comprising:
  removing at least one of the first and the second fixing bolts from a side with respect to the vehicle body frame;
  turning the caliper body around at least one of the slide pin and the collar to which the at least one of the first and the second fixing bolts is screw-fitted; and
  opening a portion overlapping with the brake disk to expose the brake pad for a maintenance activity,
  wherein a screw-fitting position of the first fixing bolt and a screw-fitting position of the second fixing bolt are arranged on a same side of the caliper bracket.

11. The method according to claim 10, wherein the first fixing bolt from the front side with respect to the vehicle is removed and the caliper body is turned with the collar serving as a center of rotation.

12. The method according to claim 10, wherein the second fixing bolt from the rear side with respect to the vehicle is removed and the caliper body is turned with slide pin serving as a center of rotation.

13. A brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels through drive shafts, power transmission shafts for transmitting a driving force from said engine to said rear wheels and said front wheels through said final gear cases, said brake device comprising:
  a brake disk fixed to at least one of said drive shafts, said power transmission shafts being propeller shafts for connecting said engine and said final gear cases to each other; and
  a brake caliper for braking by a nipping action with said brake disk, wherein said brake caliper includes
  a caliper bracket fitted to at least one of said final gear cases,
  a caliper body detachably fitted to said caliper bracket,
  a pair of fixing bolts securing said caliper body to said caliper bracket, wherein said pair of fixing bolts includes a first bolt and a second bolt, a screw-fitting direction of said first fixing bolt being opposite to a screw-fitting direction of said second fixing bolt, and wherein said screw-fitting direction of said first bolt is offset with respect to said screw-fitting direction of said second bolt, and said brake caliper is capable of turning around one of said first and second bolts when either said first or second bolt is in a disengaged position;

a slide pin parallel to at least one of said propeller shafts and fitted at a portion of the caliper bracket from a front side with respect to the vehicle body frame, wherein the first fixing bolt penetrates through the caliper body and is screw-fitted to the slide pin; and a collar extending substantially parallel to at least one of said propeller shafts and fitted at a portion of the caliper bracket wherein the second fixing bolt is inserted through the caliper bracket and the collar from a rear side with respect to the vehicle body frame and is screw-fitted into female threads formed in said caliper body.

14. The brake device for a vehicle according to claim 13, wherein said fixing bolts are disposed along a front-rear direction of said vehicle body frame.

15. The brake device according to claim 13, wherein a screw-fitting position of the first fixing bolt and a screw-fitting position of the second fixing bolt are arranged on a same side of the caliper bracket.

16. A brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels, and power transmission shafts for transmitting a driving force from said engine to said rear wheels and said front wheels through said final gear cases, said brake device comprising:

a brake disk fixed to at least one of said power transmission shafts, wherein said power transmission shafts are propeller shafts for connecting said engine and said final gear cases to each other;

a brake caliper for braking by a nipping action with said brake disk, wherein said brake caliper includes a caliper bracket fitted to at least one of said final gear cases, a caliper body detachably fitted to said caliper bracket, and a pair of fixing bolts securing said caliper body to said caliper bracket, wherein said pair of fixing bolts includes a first bolt and a second bolt, wherein said fixing bolts are disposed along a front-rear direction of said vehicle body frame and a screw-fitting direction of said first fixing bolt is opposite to a screw-fitting direction of said second fixing bolt;

a slide pin parallel to at least one of said propeller shafts and fitted at a portion of the caliper bracket from a front side with respect to the vehicle body frame, wherein the first fixing bolt penetrates through the caliper body and is screw-fitted to the slide pin; and a collar extending substantially parallel to at least one of said propeller shafts and fitted at a portion of the caliper bracket wherein the second fixing bolt is inserted through the caliper bracket and the collar from a rear side with respect to the vehicle body frame and is screw-fitted into female threads formed in said caliper body.

17. The brake device according to claim 16, wherein a screw-fitting position of the first fixing bolt and a screw-fitting position of the second fixing bolt are in a front and rear direction of the vehicle body frame, respectively.

18. The brake device according to claim 16, wherein a screw-fitting position of the first fixing bolt and a screw-fitting position of the second fixing bolt are arranged on a same side of the caliper bracket.

19. A brake device for a vehicle, said vehicle including a vehicle body frame, an engine mounted on said vehicle body frame, front wheels and rear wheels suspended from and capable of being oscillated with respect to said vehicle body frame, final gear cases for transmitting an output from said engine to said front wheels and said rear wheels, and power transmission shafts for transmitting a driving force from said engine to said rear wheels and said front wheels through said final gear cases, said brake device comprising:

a brake disk fixed to at least one of said power transmission shafts, wherein said power transmission shafts are propeller shafts for connecting said engine and said final gear cases to each other;

a brake caliper for braking by a nipping action with said brake disk, wherein said brake caliper includes a caliper bracket fitted to at least one of said final gear cases, a caliper body detachably fitted to said caliper bracket, and a pair of fixing bolts securing said caliper body to said caliper bracket, wherein said pair of fixing bolts includes a first bolt and a second bolt, wherein said fixing bolts are disposed along a front-rear direction of said vehicle body frame and a screw-fitting direction of said first fixing bolt is opposite to a screw-fitting direction of said second fixing bolt, wherein said brake caliper is capable of turning around one of said first and second bolts when either said first or second bolt is in a disengaged position; and a collar extending substantially parallel to at least one of said propeller shafts and fitted at a portion of the caliper bracket wherein the second fixing bolt is inserted through the caliper bracket and the collar from a rear side with respect to the vehicle body frame and is screw-fitted into female threads formed in said caliper body.

20. The brake device according to claim 19, wherein a screw-fitting position of the first fixing bolt and a screw-fitting position of the second fixing bolt are in a front and rear direction of the vehicle body frame, respectively.

21. The brake device according to claim 19, wherein a screw-fitting position of the first fixing bolt and a screw-fitting position of the second fixing bolt are arranged on a same side of the caliper bracket.

* * * * *